Feb. 9, 1960   H. A. LORD ET AL   2,924,368
EGG CARTON
Filed July 1, 1957   8 Sheets-Sheet 1

INVENTORS
Henry A. Lord
Harold S. Crane.
BY Karl W. Flocks
ATTORNEY

Feb. 9, 1960 H. A. LORD ET AL 2,924,368
EGG CARTON
Filed July 1, 1957 8 Sheets-Sheet 2

INVENTORS
Henry A. Lord and
Harold S. Crane,
BY Karl W. Flocks
ATTORNEY

Feb. 9, 1960 H. A. LORD ET AL 2,924,368
EGG CARTON
Filed July 1, 1957 8 Sheets-Sheet 6

INVENTORS
Henry A. Lord and
Harold J. Crane,
BY Karl W. Flocks
ATTORNEY

Feb. 9, 1960

H. A. LORD ET AL

2,924,368

EGG CARTON

Filed July 1, 1957

INVENTORS
Henry A. Lord &
Harold S. Crane,

BY Karl W. Flocks

ATTORNEY

United States Patent Office 2,924,368
Patented Feb. 9, 1960

2,924,368

EGG CARTON

Henry A. Lord and Harold S. Crane, Palmer, Mass., assignors to Diamond National Corporation, a corporation of Delaware Application July 1, 1957, Serial No. 669,362

3 Claims. (Cl. 229—2.5)

This invention relates to egg cartons, and more particularly to egg cartons of the molded pulp type.

This application is a continuation-in-part of copending application Serial No. 656,256, filed May 1, 1957.

In constructing an egg carton, an important desideratum is the provision of egg-receiving cells which will properly support and cushion the eggs contained therein against damage caused by dropping, shaking, rattling, and horizontal shock. A further important desideratum is to have egg cells which are capable of accommodating various sizes and shapes of eggs, including eggs of more or less irregular shapes.

An egg cell which is shaped as to provide three-point contact, in accordance with the instant invention, in the same horizontal plane, with the egg contained therein maintains constant positive contact with the egg at all times and even maintains an irregularly shaped egg in a steady, stable position.

Attempts have been made in the prior art to construct egg cartons having cells which provide three-point contact with the eggs in a horizontal plane. Several of the prior art constructions of this type provide three vertical wall portions in each cell which engage the egg at spaced points to obtain a form of three-point contact between the vertical cell walls and the egg. In the various prior art constructions, the three wall portions which provide the three-point contact in each cell include an outer wall portion which is part of the outer wall of the lower section of the carton and two inner wall portions which are formed by pillars or posts disposed along the central longitudinal axis of the carton. The inner cell wall portions formed by the pillars in such prior constructions, are not joined in any manner to the outer wall portion, and extend for only a relatively short portion of the total perimeter of an imaginary triangle defined when the two inner walls are projected to meet each other and the outer wall.

Due to the relative shortness of the inner cell walls of the prior art three-point contact constructions, the inner walls are relatively inflexilble, with the result that the outer wall of each cell, lying in the outer wall of the lower section of the carton, must move a greater distance than the inner cell walls to accommodate the eggs positioned in the cells. With large size eggs, the movement of the outer wall may be sufficiently great to prevent proper closure of the carton. Furthermore, in the prior art egg cartons just described, the three points of contact of the cell walls with the egg are not symmetrically spaced around the egg, with the result that the egg is not symmetrically supported about its periphery.

Accordingly, it is an object of this invention to provide an egg carton having egg-receiving cells which securely support eggs positioned therein against breakage and which support eggs having irregular surfaces against rocking or rattling in the cells.

It is another object of this invention to provide an egg carton having cells with a configuration which supports the eggs at substantially symmetrically spaced support points around the surface of the egg, and in which all walls of the egg-receiving cells are flexed in a substantially uniform manner by eggs positioned within the cells.

It is another object of this invention to provide an egg carton having cells which provide a symmetrical three-point support for the eggs in the cells.

It is still another object of the invention to provide an egg carton having egg-receiving cells whose walls are capable of flexing to provide a greater cushioning effect than egg cartons of the prior art.

It is a further object of the invention to provide an egg carton having egg-receiving cells which maintain constant positive contact with the eggs in the respective cells and thereby prevent movement of the eggs in the cells.

It is a still further object of the invention to provide an egg carton capable of receiving and holding a variety of shapes and sizes of eggs within the same carton.

A still further object of the invention is to provide an egg carton which is structurally strong and which resists externally applied forces tending to produce lateral and longitudinal deformation of the carton, while at the same time providing ample cushioning action on the eggs contained within the carton.

Still a further object of this invention is to provide an egg carton which may be easily unnested from a stack of cartons, and which supports eggs in the cells with good anti-rattling characteristics.

In achievement of these objectives, there is provided in accordance with an embodiment of this invention an egg carton of the molded pulp type including a bottom or egg-receiving section having a plurality of molded egg-receiving cells. Each cell includes an outer cell wall defining a part of one of the outer longitudinal walls of the carton, and a pair of side cell walls which converge toward each other and toward the central longitudinal axis of the carton. The outer bounding wall of each cell and the two converging side walls of each cell are each of substantially the same length and extend upwardly from a cell base which is of substantially equilateral triangular shape. The adjacent edges of the outer and side walls of the cell are joined together by relatively narrow auxiliary connecting walls to form an egg cell which has substantially the shape of an equilateral triangle in horizontal cross section.

In accordance with a modified embodiment of this invention, an egg carton is provilded with egg cells having a triangular base portion and main walls, including outer and side cell walls, extending upwardly from the triangular base portion. The main walls are each substantially as long as one of the edges of the triangular base portion at their lower end, but taper as they progress upwardly from the cell base portion to become shorter in length perimetrically of the cell. Adjacent main cell walls are connected by arcuate auxiliary walls which taper as they progress upwardly from the cell base portion to become longer in length perimetrically of the cell. The curved auxiliary walls are capable of straightening out to accommodate deflection of the main cell walls, thereby compensating for the lesser flexibility of the shortened main walls as compared to the corresponding walls of the first described embodiment.

In the modified embodiment, the eggs are supported adjacent their lower ends by the three main cell walls which provide a three-point contact for the eggs which insures that each egg is symmetrically positioned and supported within the cell. The auxiliary walls are substantially steeper than the main walls of the cell and do not contact the egg in the region where it is supported by the main cell walls.

A further feature of the construction of the modified embodiment is the use of a dual angle of inclination on the main cell walls, the main walls extending upwardly from the base for approximately the lower half of their height at an angle of substantially 28½ degrees from the vertical, the main cell walls being inclined at a lesser angle, such as 17½ degrees from the vertical for the remaining portion of their height. The larger angle of inclination from the vertical of the main walls at the lower end of the cell removes bulk from the bottom of the cell and facilitates unnesting of the stacked cartons. The smaller angle of inclination from the vertical of the main walls at the upper end of the cell reduces the clearance between the upper end of the egg and the main walls of the cell and thereby improves the anti-rattling characteristics of the cell.

Other objects and the nature and advantages of the instant invention will be apparent from the following description taken in conjunction with the accompanying drawings, wherein:

Referring now to the drawings, and more particularly to Figs. 3–9, inclusive, the egg carton is generally indicated at 10 and includes integral bottom and cover sections generally indicated at 12 and 14, respectively, formed of molded pulp, and connected together by a hinge 16.

Cover section 14 is of dished construction and includes a top wall 18 of generally rectangular shape having a peripheral wall 20 which extends downwardly and at a slight inclination outwardly along the entire periphery of top wall 18, with respect to the closed position of the carton. Downwardly and outwardly inclined wall 20 includes a rear wall portion 22 which terminates at hinge 16 and a forward or front wall portion 24 which carries a pair of spaced tab members 25 which engage slots in the lower section of the carton to hold the cover in closed position, as will be described hereinafter.

The bottom or egg-receiving section 12 of the carton includes a plurality of molded egg-receiving cells generally indicated at 26 which, in the illustrated embodiment, are arranged in two longitudinal rows 28 and 30 each having six cells, to thereby form a 2 x 6 carton. However, the cells may be arranged to form a 3 x 4 carton, or in other arrangements, if desired.

Figure 1:
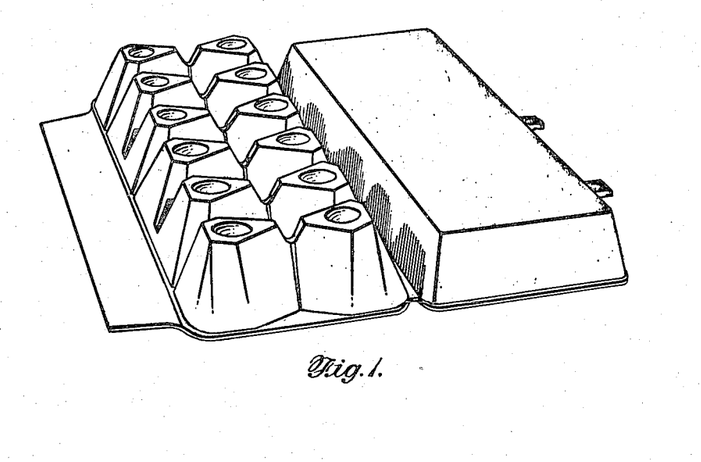
Fig. 1 is a view of the fully opened egg carton in inverted position, showing the bottom section and the connected cover section of the carton in perspective.
Figures 2, 2A:
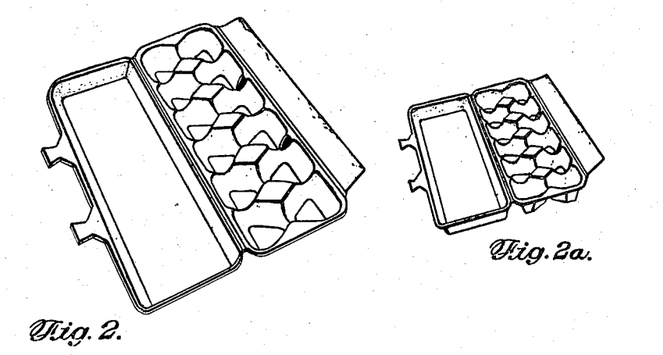
Fig. 2 is a view of the fully opened egg carton, showing the inside of both the cover and bottom sections of the carton in perspective.
Fig. 2a is a view similar to Fig. 2 but on a reduced scale and taken from a lower observation point so as to show the end of the carton as well as the inside.
Figure 3:
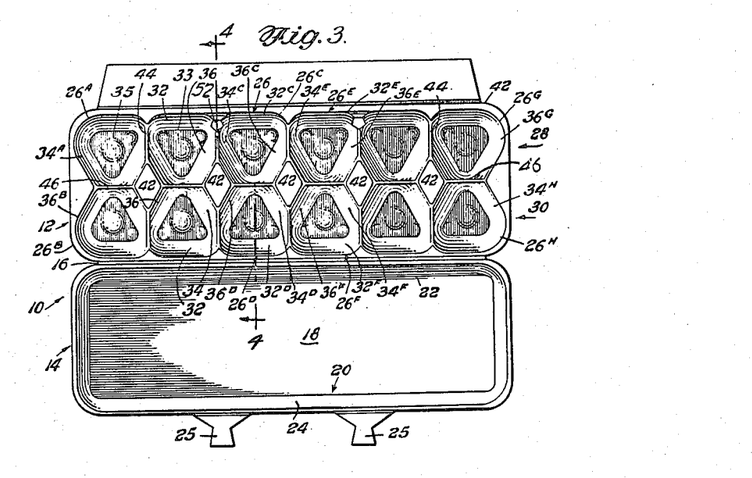
Fig. 3 is a top plan view of the inside of the egg carton in fully open position.

To facilitate the description which follows, certain of the cells 26 have been assigned specific reference numerals. Thus, the two end cells at the left of the view of Fig. 3 are designated as 26A and 26B, respectively; the four centrally disposed cells on either side of the central transverse axis of the carton have been identified as 26C, 26D, 26E and 26F, respectively; while the two cells at the right-hand end of the view of Fig. 3 have been designated as 26G and 26H, respectively.

Each cell 26 includes an outer wall 32 which lies in or forms part of either the front or rear longitudinal wall of the bottom section of the carton, depending on whether the cell lies in front longitudinal row 28 or rear longitudinal row 30. Each cell also includes a pair of side walls 34 and 36 which converge toward each other and toward the central longitudinal axis of the carton substantially from the opposite ends of outer cell wall 32. Cell walls 32, 34, 36 of each respective cell are of substantially equal length and together define an egg cell having substantially the shape of an equilateral triangle. Cell walls 32, 34, 36 support the lower portion of the egg with a symmetrical three-point contact.

Outer cell wall 32 and the two side cell walls 34 and 36 of each cell taper downwardly and inwardly at a small angle from the vertical plane, such as an angle of 17½ degrees, for example, to merge with a horizontal cell base 35 having substantially the shape of an equilateral triangle. Each cell base 35 is provided at substantially the center thereof with a round portion 33 which is raised slightly above the remainder of the inside surface area of the cell base 35, and which serves as a support for the lower end of bottom of the egg.

Due to the slight inclination of cell walls 32, 34 and 36 from a vertical plane, the planes of the respective walls would intersect beyond the desired confines of the cell if the respective adjacent walls of each respective cell were projected until they intersected. Thus, for example, due to their inclination from a vertical plane, side walls 34 and 36 of any given cell would intersect on the opposite side of the longitudinal axis of the carton from that on which the respective cell lies. For this reason, adjacent cell walls 32, 34 and 36 are not projected until they actually intersect but instead are joined by relatively narrow auxiliary walls respectively identified as 37, 39, 41. Auxiliary wall 37 joins cell walls 32 and 34; auxiliary wall 39 joins cell walls 34 and 36; and auxiliary wall 41 joins cell walls 32 and 36. The auxiliary walls are of tapering width in a direction perimetrically of the cell, having their maximum width at their upper edge and their minimum width at their lower edge.

The outer walls 32 of the plurality of cells lying in row 28, together with the relatively narrow auxiliary walls 37 and 41, collectively define the forward wall of the bottom section of the carton. In a similar manner, outer walls 32 of the egg cells 26 lying in the rear longitudinal row 30 of the bottom section, together with the auxiliary walls 37 and 41 between adjacent walls 32, collectively define the rear longitudinal wall of the carton.

The bottom section 12 of the carbon includes a plurality of spaced hollow post members 42 lying along the central longitudinal axis of the bottom section. Each post member 42 is formed by a portion of the side walls of four egg cells. Thus, the post member 42 which lies at the intersection of the central longitudinal and transverse axes of the carton is formed by portions of walls 36C, 34D, 34E and 36F of cells 26C, 26D, 26E and 26F, respectively.

A portion of the two side walls 34 and 36 of each cell except end cells 26A, 26B, 26G and 26H, as well as the connected auxiliary walls 37 and 41 of each cell, is of downwardly depressed arcuate shape when viewed from the inside of the carton, or of generally V-shape in vertical elevation. The bottom of the depressed V-shaped wall portion is of substantially lesser height than the tops of the hollow post members 42 and than the outer edge or rim of the lower carton section. The abutting depressed wall portions of each pair of adjacent cells in the same longitudinal row merge together to form a depressed ridge 44 lying between adjacent cells. The outer edge of ridge 44 also defines a web which connects the auxiliary walls 37 and 41 of adjacent cells.

In the case of end cells 26A, 26B, 26G and 26H, the respective walls 34A, 36B, 36G, 34H, and the auxiliary walls 37A, 41B, 37H and 41H extend to the full height of the rim of bottom section 14 and define the end walls of lower section 14 of the carton. Thus, cell walls 34A and 36B of end cells 26A and 26B together with auxiliary cell walls 37A and 41B (Fig. 5) define the left end wall of the bottom section of the carton, while cell walls 36G and 34H of cells 26G and 26H together with auxiliary cell walls 37H and 41H define the right end wall of the bottom section of the carton, with respect to the view shown in Fig. 5.

Along the opposite longitudinal sides of the carton, the upper edges of outer walls 32 of the egg cells, together with the upper edges of auxiliary walls 37 and 39 between each pair of adjacent cells form the rim or upper edge of lower carton section 12. At the ends of the lower carton section, the rim is formed by the upper edges of cell walls 34A, 36B, 36G and 34H of cells 26A, 26B, 26G and 26H, respectively, and by the upper edges of auxiliary walls 37A, 41B, 37H and 41G. The rim is of greater width at the ends than along the longitudinal edges of the lower carton section since the rim extends from the upper end of the inwardly tapered end cell walls out to a line perpendicular to the longitudinal edge of the carton, as indicated at 45, the wide rim portion 45 and the end cell walls connected thereto defining in effect a half post at each end of the lower section of the carton.

The auxiliary walls 39 of each pair of laterally opposite egg cells, such as cells 26C and 26D, for example, merge to define a depressed ridge 46 lying substantially along the central longitudinal axis of the carton. The lowest point of ridge 46 is positioned at a lesser height above base portion 35 of the respective cells than the lowest point of the generally V-shaped arcuate ridge 44 previously described. In the illustrated embodiment, the lowest point of ridge 46 is approximately half as high above cell base 33 as the lowest point of ridge 44.

Figure 4:
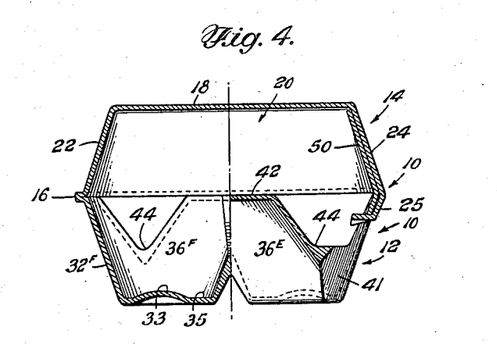
Fig. 4 is a view in transverse section of the egg carton taken along lines 4—4 of Figs. 3 and 5, when closed.
Figure 5:
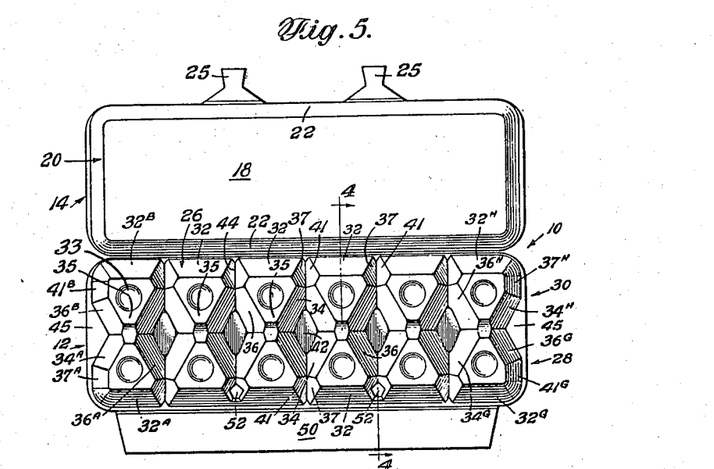
Fig. 5 is a bottom plan view of the egg carton in fully open position.
Figure 6:
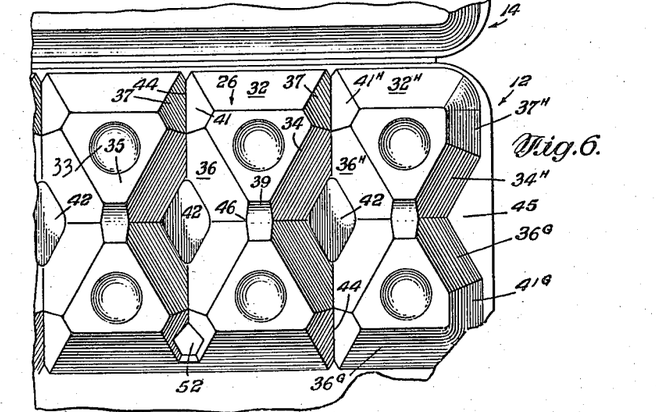
Fig. 6 is an enlarged view of the right-hand end of the bottom of the egg carton as viewed in Fig. 5.
Figure 7:
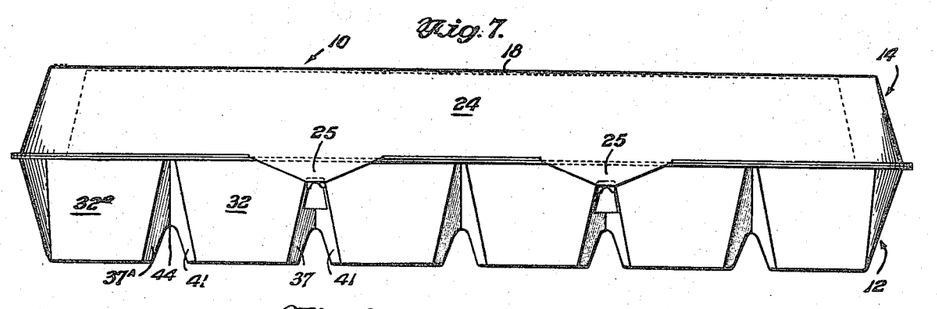
Fig. 7 is a front elevational view of the egg carton.
Figure 8:
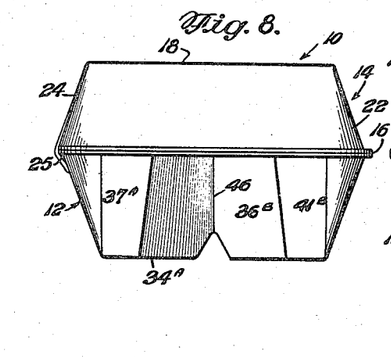
Fig. 8 is an end view of the egg carton looking from the right end of the view of Fig. 7.
Figure 9:
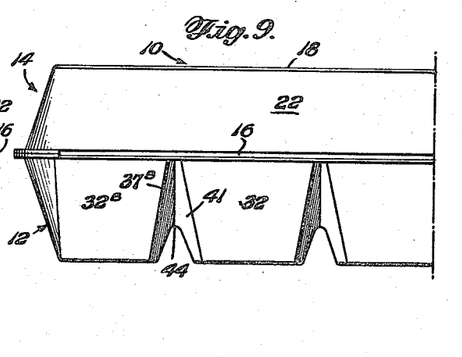
Fig. 9 is a fragmentary rear view in vertical elevation of the egg carton.
Figures 10, 11:
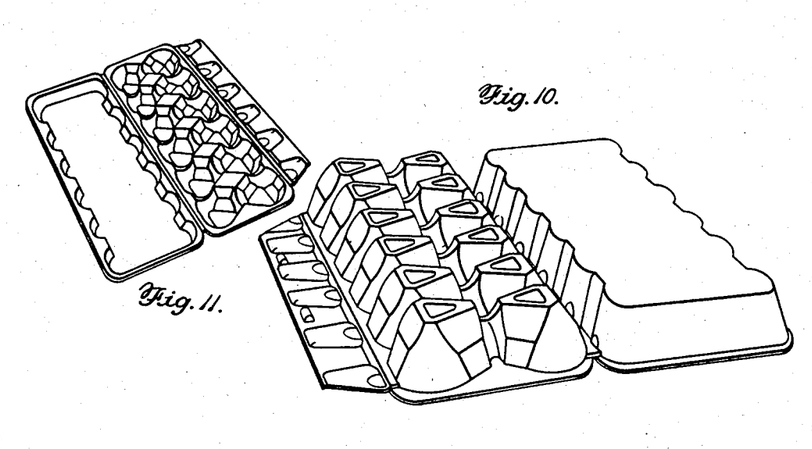
Fig. 10 is a perspective view of the outside of a modified egg carton having longer auxiliary connecting walls between the main walls of the egg cells.
Fig. 11 is a perspective view of the egg carton in fully open position, showing the inside of both the cover and bottom sections.

A flap member 50 which extends for a short distance less than the entire length of the carton is integrally hinged to the forward rim of the carton. When the carton is in closed position, as seen in Figs. 4, 7, 8 and 9, flap member 50 is bent upwardly from a normally horizontal position through an angle of slightly more than 90 degrees into a plane slightly beyond the vertical plane so as to lie inside cover member 14 as best seen in Fig. 4. Tab portions 25 of the cover member are then inserted through slots 52 which are formed in several of the auxiliary wall portions 37 and 41 between adjacent connected forward wall portions 32 of cells 26 lying in forward cell row 28.

Referring now to the modified embodiment shown in Figs. 10–17, inclusive, the modified egg carton generally indicated at 110 is preferably formed of molded pulp and includes integral bottom and cover sections generally indicated at 112 and 114, respectively, connected together by a hinge 116. Cover section 114 is of dished construction and includes a top wall 118 of generally rectangular shape having a peripheral wall 120 which extends downwardly at a slight inclination outwardly along the entire periphery of top wall 118, with respect to the closed position of the carton. Downwardly and outwardly inclined wall 120 includes a rear wall portion 122, which terminates at hinge 116, and a forward or front wall portion 124. The longitudinal wall portions 122 and 124 of peripheral wall 120 are provided at spaced intervals with convex wall portions 123 separated by straight wall portions. At spaced-apart points along the forward or front wall portion 124 a pair of rectangular-shaped openings 125 are provided. Bottom section 112 is provided at its forward edge with a hingedly connected flap member 127 which is folded upwardly past a vertical position when the carton is closed. Flap 127 has convex wall portions 129 which interlockingly engage convex wall portions 123 of peripheral wall 120 on cover 114. Also, flap 127 is provided with a pair of spaced protuberances or projections 131 which engage rectangular openings 125 of cover 114 to lock the bottom and cover sections together in closed position when desired.

The bottom or egg-receiving section 112 of the carton includes a plurality of molded egg-receiving cells each generally indicated at 126 which, in the illustrated embodiment, are arranged in two longitudinal rows 128 and 130 each having six cells, to thereby form a 2 x 6 carton. However, the cells may be arranged to form a 3 x 4 carton, or in other arrangements if desired.

Figure 12:
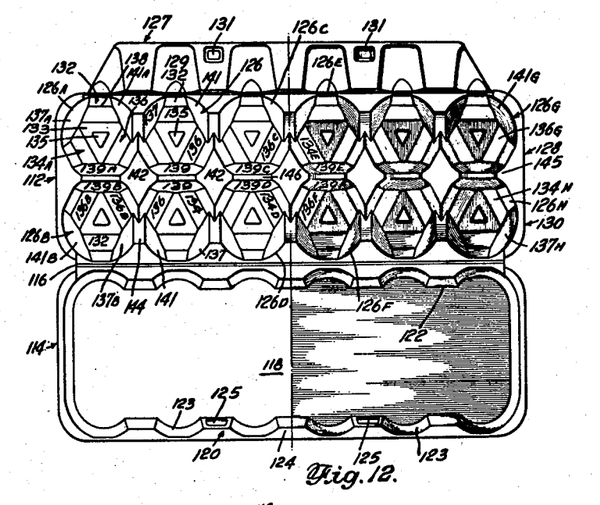
Fig. 12 is a top plan view of the inside of the egg carton in fully open position.
Figure 13:
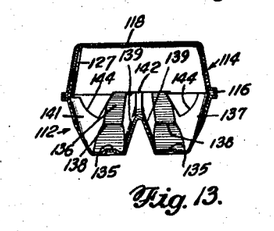
Fig. 13 is a view in transverse section taken along line 13—13 of Fig. 14 with the egg carton in closed position.
Figure 14:
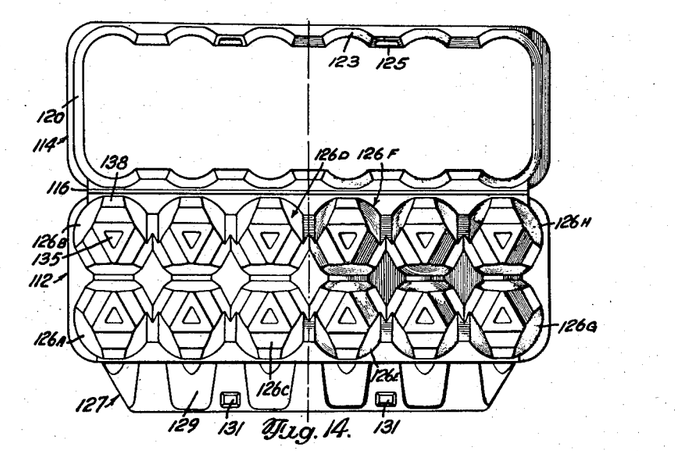
Fig. 14 is a bottom plan view of the egg carton in fully open position.
Figure 15:
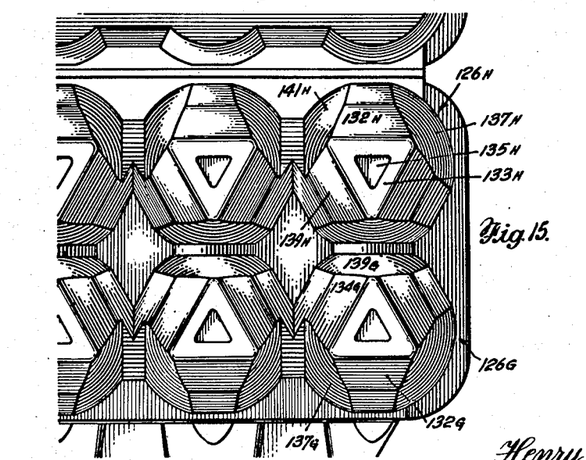
Fig. 15 is an enlarged view of the right-hand end of the bottom of the egg carton as viewed in Fig. 14.
Figure 16:
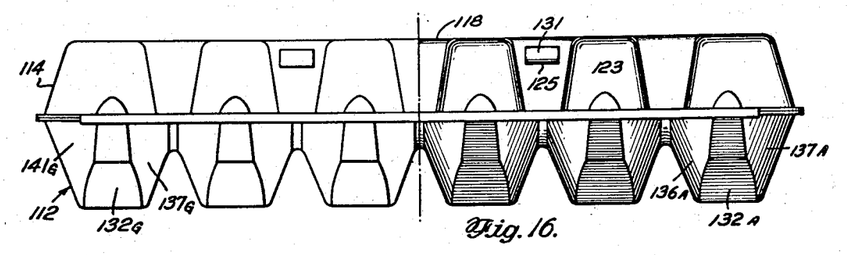
Fig. 16 is a front elevation view of the egg carton.
Figure 17:
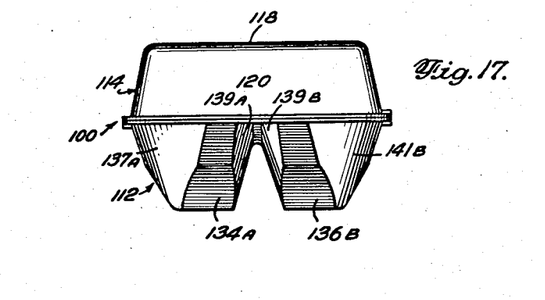
Fig. 17 is an end view of the egg carton looking from the right-hand end of Fig. 16.

To facilitate the description which follows, certain of the cells 126 have been assigned specific reference numerals. Thus, the two end cells at the left of the view of Fig. 12 are designated as 126A and 126B, respectively; the four centrally disposed cells on either side of the central transverse axis of the carton have been identified as 126C, 126D, 126E and 126F, respectively; while the two cells at the right-hand end of the view of Fig. 12 have been designated as 126G and 126H, respectively.

Each cell 126 includes a horizontal base portion 133 having substantially the shape of an equilateral triangle. Each cell base portion 133 is provided at substantially the center thereof with a small triangular portion 135 which is raised slightly above the remainder of the inside surface area of cell base 133 and which serves as a surface on which the lower end of the egg may rest.

Extending upwardly from each of the three edges of cell base 133 of each cell are three main cell walls including an outer wall 132 and two side walls 134 and 136. Each of the walls 132, 134, and 136 tapers in width perimetrically of the cell in extending upwardly toward the top of the bottom carton section. Furthermore, each of the cell walls 132, 134 and 136 inclines upwardly and outwardly from base portion 133 at an angle from the vertical plane such as an angle of 28½ degrees, for example, for slightly more than half of its height, each of the respective main walls then tapering upwardly at a lesser angle, such as 17½ degrees, from the vertical for the remainder of its height. The junction between the portion of each cell wall which inclines at the larger angle of 28½ degrees and the remaining portion which inclines at the lesser angle of 17½ degrees is indicated at the line 138 in wall 132 of cell 126A, the other main walls of each cell having similar junctions between the lower wall portion of greater inclination away from the vertical and the upper wall portion of lesser inclination away from the vertical.

The dual angle of inclination of each main wall as just described has several advantages. The use of a larger angle of inclination from the vertical at the lower portion of the cell, such as the 28½ degree angle, removes bulk from the bottom of the cell and insures easier unnesting of stacked cartons. The smaller angle of inclination at the upper portion of the cell or pocket reduces the clearance between the main cell walls and the upper end of the egg, and thereby gives the cell a better anti-rattling characteristic, but at the same time provides sufficient tolerance at the upper end of the cell to accommodate variations in size and shape of eggs loaded in the carton.

The upper portions of the main cell walls, together with the upper portions of the auxiliary walls to be described, encircle the upper portion of the egg and thereby assist in obtaining proper axial disposition of the egg in the cell. This helps to provide a better anti-rattling characteristic for the cell.

Each pair of adjacent main cell walls 132, 134 and 136 are joined together by an auxiliary wall which tapers in width in extending upwardly from the cell base to have a length perimetrically of the cell in its upper portion which is substantially greater than the length of the auxiliary walls of the egg carton embodiment shown in Figs. 1–9.

Three auxiliary walls are used in each egg cell, including auxiliary walls 137, 139 and 141. Each auxiliary wall is of slightly convex arcuate shape in extending between the adjacent main walls which it joins. Auxiliary wall 137 extends between outer cell wall 132 and side cell wall 134; auxiliary wall 139 extends between side walls 134 and 136; while auxiliary wall 141 extends between outer wall 132 and side wall 136 of each cell. Each of the auxiliary walls 137, 139 and 141 extends upwardly from one of the respective apices of the equilateral-triangular-shaped egg cell base portion 133. The width of each wall in a direction around the perimeter of the egg cell increases as the height of the respective auxiliary wall increases above the cell base portion 133, since the width of the auxiliary wall is substantially zero at the apex of base portion 133, but reaches its maximum width at the top of the respective auxiliary wall.

Auxiliary walls 137, 139, 141 have a uniform inclination upwardly from cell base portion 133, and are substantially steeper in their lower portion than the adjacent main walls 132, 134, 136. The auxiliary walls may have an angle of inclination for their entire height which is substantially equal to the inclination of the upper portion of the main cell walls, namely, 17½ degrees. The eggs are not contacted by the auxiliary walls adjacent the bottom of the cell, the egg being contacted and supported in the lower region only by the three main cell walls.

The outer walls 132 of the plurality of cells lying in row 128, together with the auxiliary walls 137 and 141, collectively define the forward wall of the bottom section 112 of the carton. In a similar manner, outer walls 132 of egg cells 126 lying in rear longitudinal row 130 of the bottom section, together with auxiliary walls 137 and 141 between adjacent outer cell walls 132, collectively define the rear longitudinal wall of the bottom section of the carton.

Bottom section 112 of the carton includes a plurality of spaced hollow post members 142 lying along the central longitudinal axis of the bottom section. Each post member 142 is formed by a portion of the side and auxiliary walls of four adjacent egg cells. Thus, post member 142 which lies at the intersection of the central longitudinal and transverse axes of the carton is formed by walls 136C, 134D, 134E and 136F of cells 126C, 126D, 126E and 126F, respectively. Each past member 142 is also formed partially by the auxiliary walls 139 of the four cells bounding each post member 142. Thus, for example, the post member 142 lying at the intersection of the central longitudinal and transverse axes of the lower section of the carton is formed partially by the abutting auxiliary walls 139C, 139D, 139E and 139F. The junction of auxiliary walls 139 with each post 142 forms a buttressed construction which reinforces the carton against longitudinal and lateral distortion.

The auxiliary walls 139 of each pair of laterally opposite egg cells, such as cells 126C and 126D, for example, merge to define a depressed ridge 146 lying substantially along the central longitudinal axis of the carton between adjacent posts 142.

A portion of the auxiliary walls 137 and 141 of each cell except end cells 126A, 126B, 126G and 126H inclines downwardly in approaching the respective adjacent side walls 134 and 136 of the respective cells. This downward inclination of a portion of the auxiliary walls 137 and 139, combined with the tapering width of the adjacent side walls 134 and 136 of the respective cells, defines a pair of oppositely disposed downwardly depressed arcuate wall portions of generally V-shape in vertical elevation for each of the cells except the end cells. The depressed V-shaped wall portions of adjacent cells in the same longitudinal row merge together to form a depressed ridge 144 lying between adjacent cells in the same row. The bottom of the depressed V-shaped ridge 144 is of substantially lesser height than the tops of hollow post members 142 and than the outer edge or rim of the lower carton section. The outer edge of each ridge 144 also defines a web which connects the auxiliary walls 137 and 141 of a pair of adjacent cells.

In the case of end cells 126A, 126B, 126G and 126H, the respective auxiliary walls 137A, 141B, 141G and 137H extend to the full height of the top rim of bottom section 112 and define part of the end walls of lower carton section 112. Thus, main cell walls 134A, 136B of end cells 126A, 126B, together with auxiliary cell walls 137A and 141B define the left end wall of the bottom section of the carton, while main cell walls 136G and 134H of cells 126G and 126H together with auxiliary cell walls 141G and 137H define the right end wall of the bottom section of the carton, with respect to the view shown in Fig. 12.

Along the opposite longitudinal sides of the carton, the upper edges of outer walls 132 of the egg cells, together with the upper edges of auxiliary walls 137 and 139 between each pair of adjacent cells form the rim or upper edge of lower carton section 112. Auxiliary walls 137 and 139 of each pair of adjacent cells in the same row, in curving in opposite directions in their respective cells, define half posts 144 along the opposite upper edges of lower carton section 112.

At the ends of the lower carton section, a rim extends from the upper edges of main cell walls 134A, 136B, 136G and 134H of cells 126A, 126B, 126G and 126H, respectively, and from the upper edges of auxiliary walls 137A, 141B, 141H and 137G. The rim extends from the upper end of the inwardly tapered end cell walls out to a line perpendicular to the longitudinal edge of the carton, as indicated at end rim portion 145, rim portion 145 and the end cell walls connected thereto defining a half post at each end of the lower section of the carton.

The egg cell constructions hereinbefore described provide a firm support for eggs positioned in the cells. The main walls of each egg cell of both embodiments of the invention hereinbefore described provide a three-point support for the lower portion of the egg in each cell which insures a constant positive contact with the egg at all times, thereby resisting and substantially preventing rattling and movement of the eggs within the cells. The triangular-shaped cell base and the main walls upstanding therefrom in each embodiment provide an egg-receiving pocket whose egg bearing surfaces have a greater effective length than those of a cell having more than three sides which serve as egg bearing surfaces. As a result, each of the three main sides is capable of greater deflection than the sides of a four-sided cell, and consequently provides a greater cushioning action on the egg positioned in a given cell. Furthermore, the flexibility of the cell walls permits a variety of egg shapes and sizes to be packed within the same carton. A further advantage of the constructions hereinbefore described is that the center posts, together with the laterally and longitudinally extending ridges, provide a bracing structure which resists externally applied forces tending to cause lateral and longitudinal deformation of the carton, although the individual cells are amply flexible to accommodate eggs positioned therein. This latter advantage is particularly evident in the embodiment of Figs. 10-17 in which the longitudinal ridges provide a strong buttress construction which reinforces the center posts of the carton.

The modified embodiment of Figs. 10-17 provides three-point contact for the egg just as in the embodiment of Figs. 1-9, with the advantages resulting therefrom, since the auxiliary connecting walls, although relatively much longer and larger than the auxiliary walls of the embodiment of Figs. 1-9, are substantially steeper than the main walls in the lower egg supporting region of the cell, with the result that the auxiliary walls do not contact the egg in the lower or egg supporting region of the cell. The auxiliary walls do not have an egg supporting function, but instead serve as resilient connecting members between adjacent main walls which permit deflection of the main walls. While the main walls of the embodiment of Figs. 10-17 are shorter perimetrically of the cell than the main walls of the embodiment of Figs. 1-9, and therefore have less flexibility in themselves, the arcuate auxiliary walls are capable of straightening out under tension and thereby permit a yielding of the main walls under pressure exerted by the eggs.

The dual angle of inclination of the main walls of the embodiment of Figs. 10-17 has the advantage that the larger angle of inclination away from the vertical (28½ degrees) at the lower portion of the walls removes bulk from the lower portion of the egg cells or pockets, and also facilitates removal of cartons from stacked relation, while the smaller angle of inclination at the upper portion of the main walls reduces the clearance between the main walls and the upper portion of the egg, thereby improving the anti-rattling characteristic of the egg cell. The upper portions of the main cell walls and the upper portions of the auxiliary walls surround the egg above the plane of three-point contact to assist in properly disposing the egg axially in the cell, the spacing of the walls having sufficient tolerance to accommodate a variety of egg sizes.

It will be obvious to those skilled in the art that various changes may be made wtihout departing from the spirit of the invention and therefore the invention is not limited to what is shown in the drawings and described in the specification but only as indicated in the appended claims.

What is claimed is:

1. A molded pulp egg carton comprising two rows of cup-like egg cells, a row of upstanding posts between said rows of cells, each of said posts having a discrete base and a top, said base being generally diamond-shaped with the long axis of said diamond extending transversely of the axes of said rows, and the short axis of said base being generally parallel to the axes of said rows, said top being generally diamond-shaped with the long axis of said top extending transversely of the axes of said rows, said cells having a generally triangular-shaped bottom, a horizontal section above the bottom of each cell being a closed geometrical figure.

2. A molded pulp egg carton in accordance with claim 1, the minor axis of the diamond-shaped top being substantially equal in length to one of its sides.

3. A molded pulp egg carton in accordance with claim 2, the respective sides of said diamond-shaped top being parallel to the corresponding sides of said diamond-shaped base.

References Cited in the file of this patent

UNITED STATES PATENTS

| 1,975,129 | Sherman | Oct. 2, 1934 |
| 2,423,756 | Chaplin | July 8, 1947 |
| 2,529,140 | Cox | Nov. 7, 1950 |
| 2,756,918 | Schwartzberg | July 31, 1956 |
| 2,815,162 | Grant | Dec. 3, 1957 |

FOREIGN PATENTS

| 164,896 | Australia | July 2, 1953 |